March 4, 1952 — B. T. AASLAND ET AL — 2,587,678
LIME SPREADER
Filed July 24, 1948 — 7 Sheets-Sheet 6

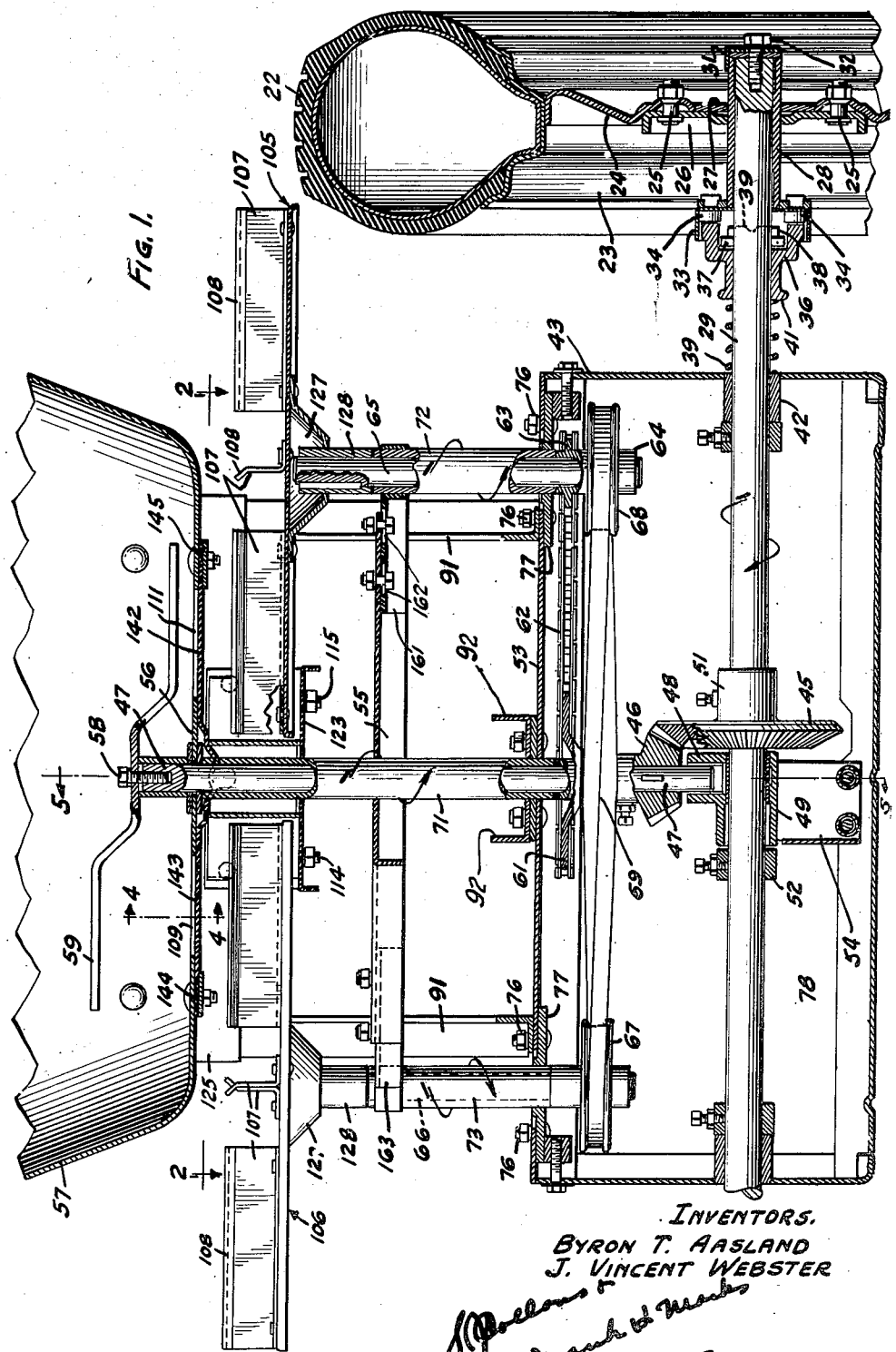

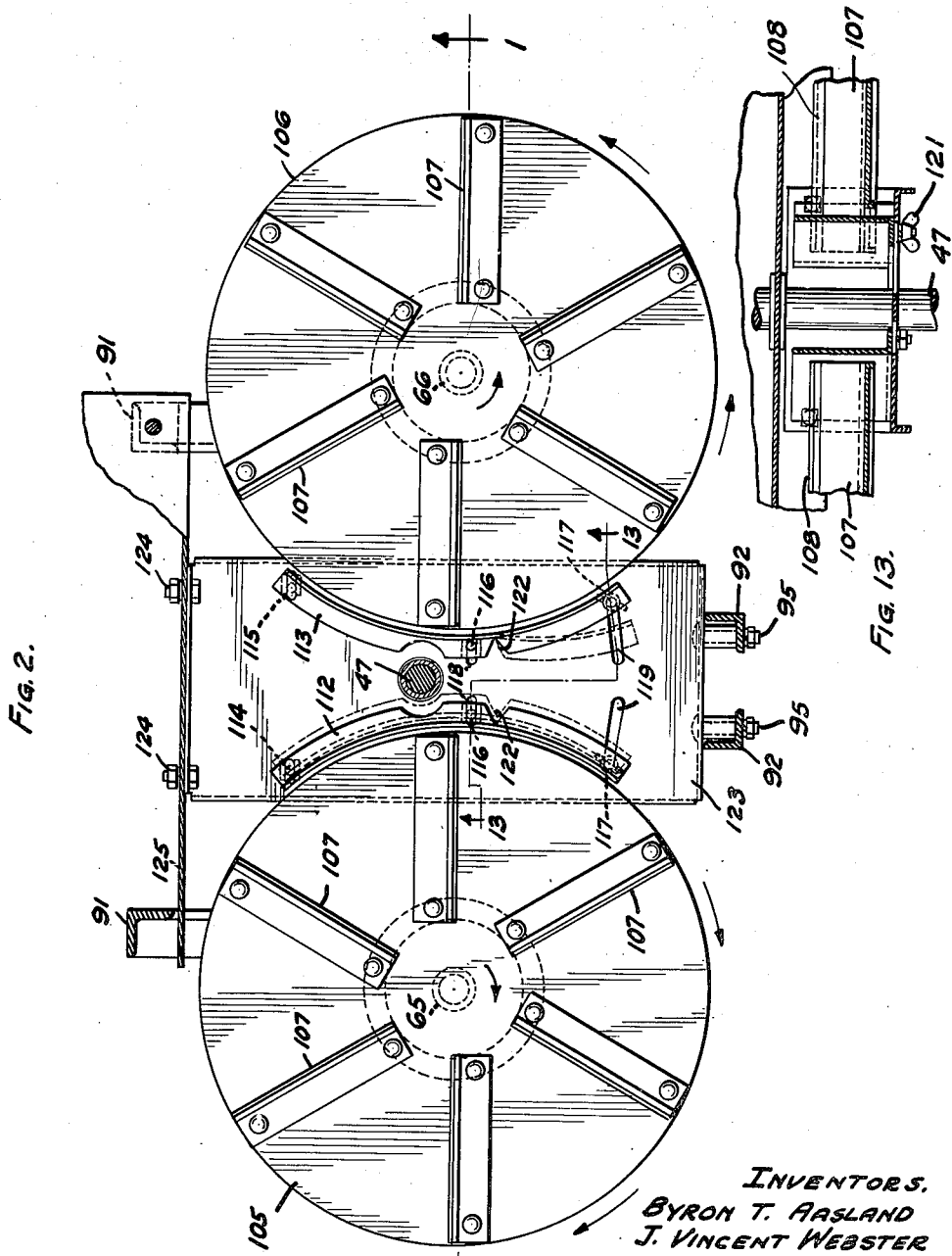

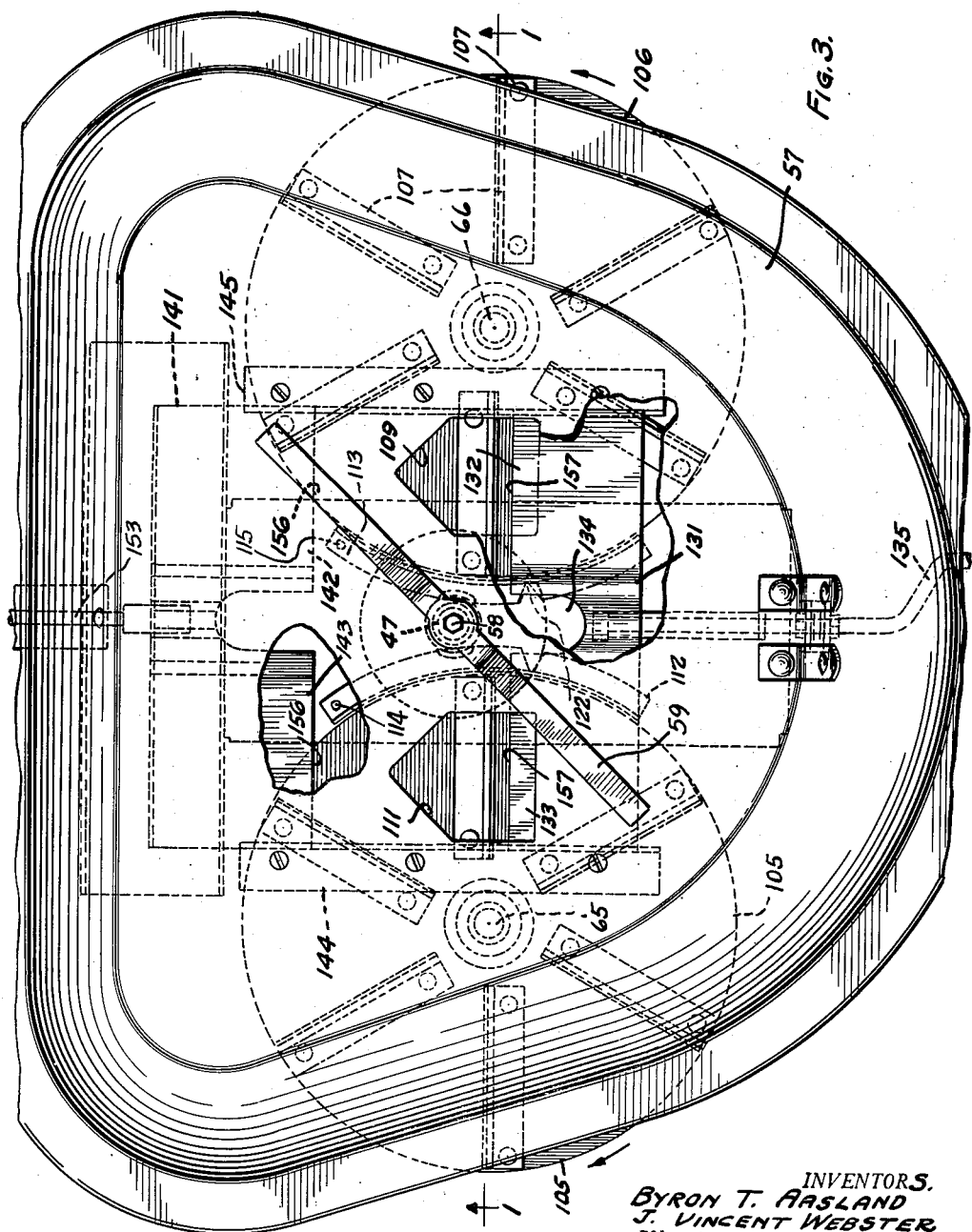

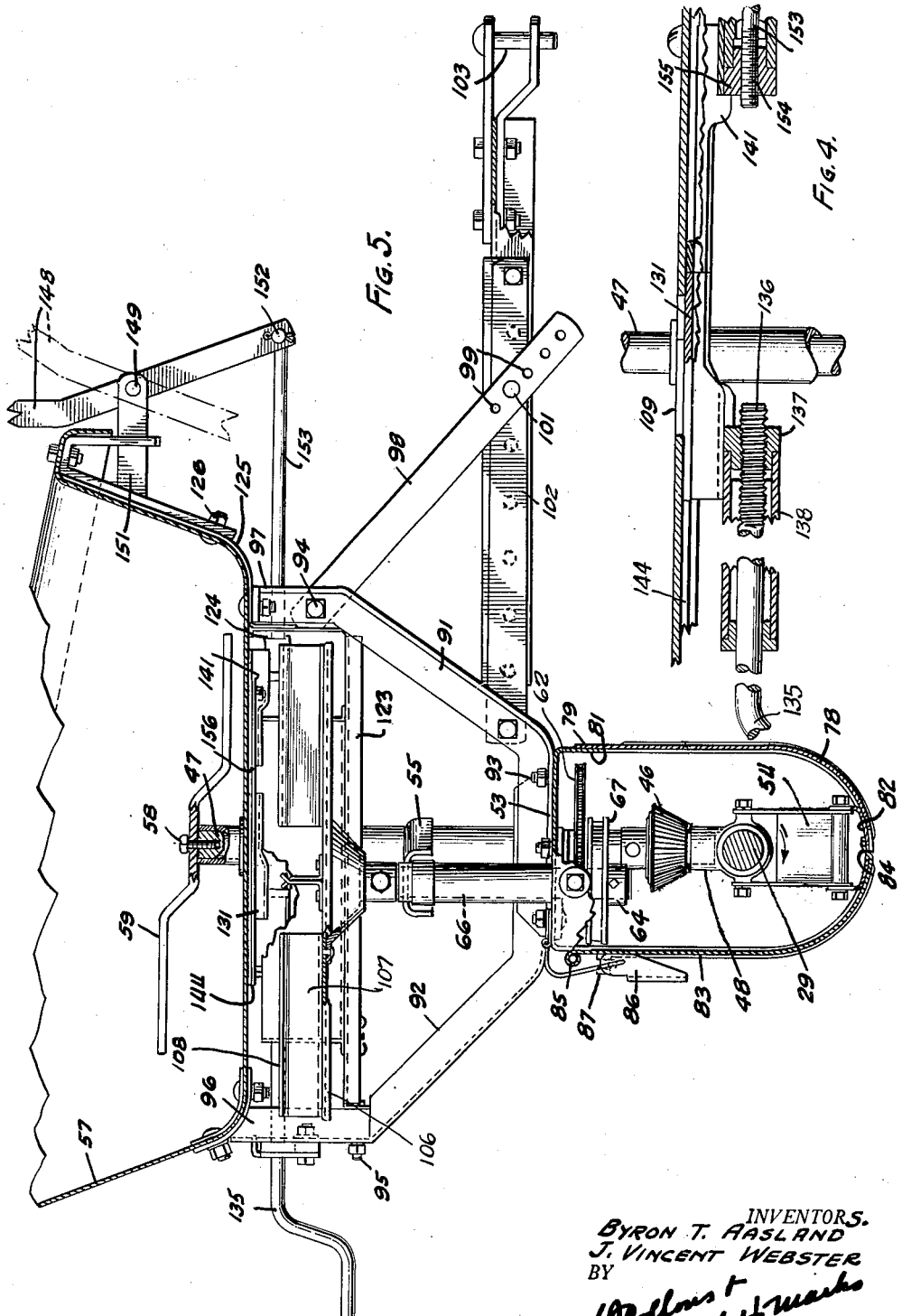

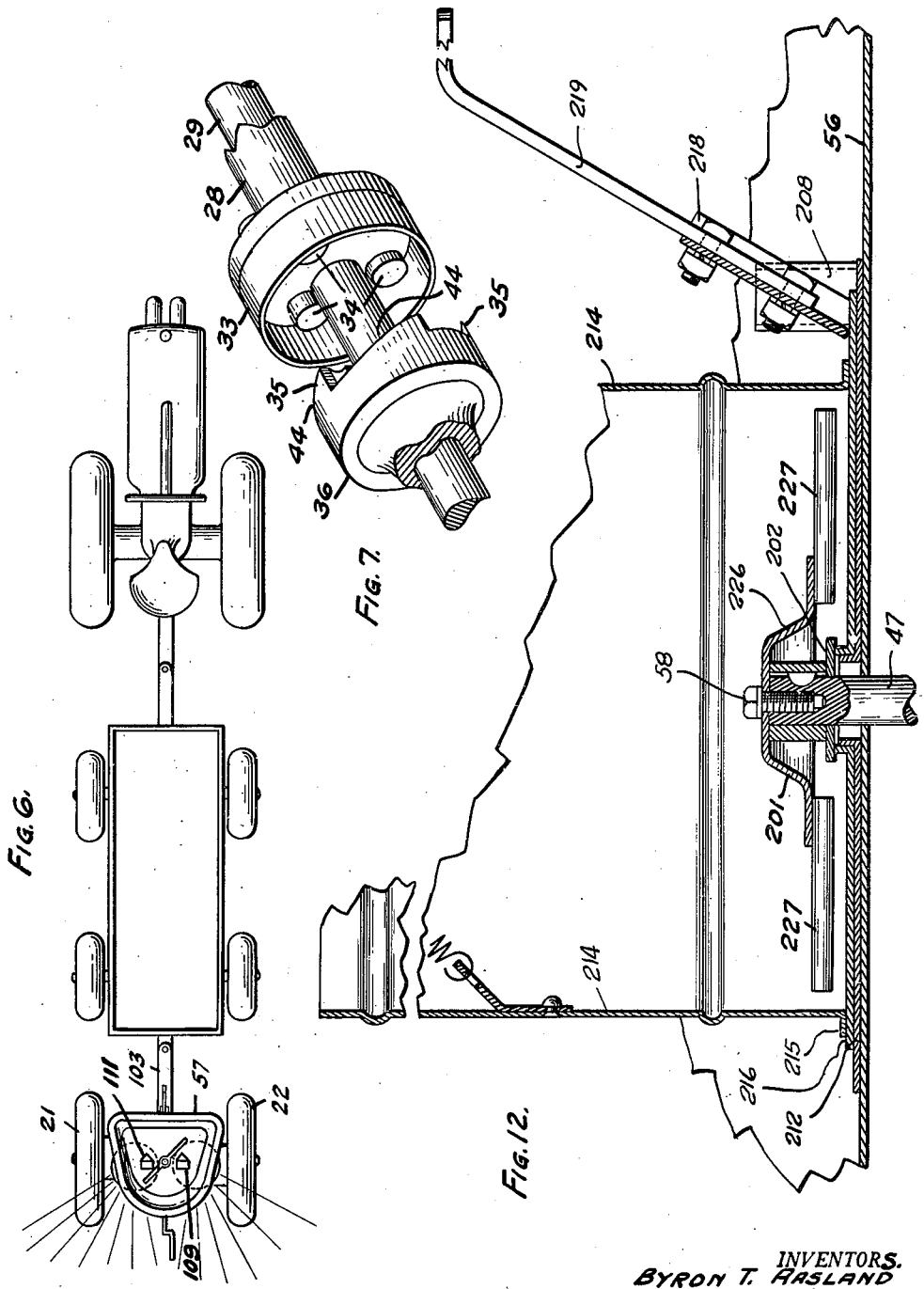

INVENTORS.
BYRON T. AASLAND
J. VINCENT WEBSTER
ATTORNEYS.

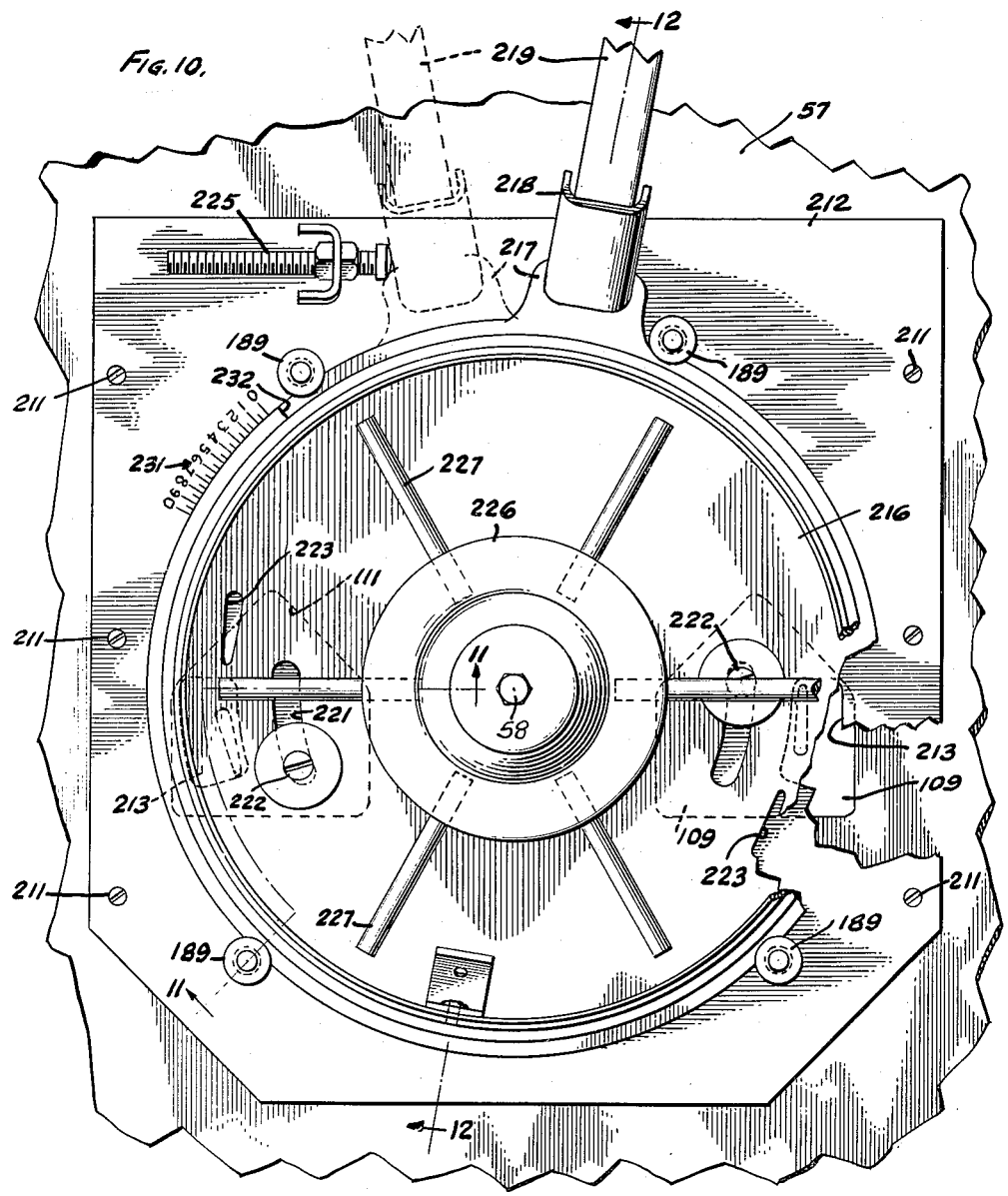
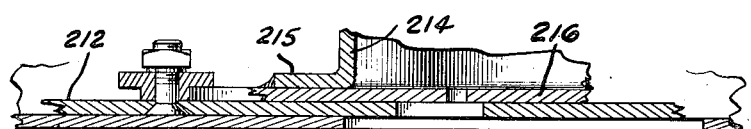

Patented Mar. 4, 1952

2,587,678

UNITED STATES PATENT OFFICE 2,587,678

LIME SPREADER

Byron T. Aasland and John Vincent Webster, Kankakee, Ill., assignors to Sears, Roebuck and Co., Chicago, Ill., a corporation of New York Application July 24, 1948, Serial No. 40,463

4 Claims. (Cl. 275—8)

The present invention relates to a portable lime and seed broadcasting apparatus and is concerned more particularly with the provision of a portable reservoir and power driven broadcasting apparatus which may be predeterminably adjusted and regulated to effect metered distributing operations for various classes of farm seed, such as are adapted to be scatter planted without regard to linear or furrow alignments.

Certain classes of farm seed are advantageously planted by being scattered on the surface of newly tilled soil and for their successful distribution depend upon consistent evenness in broadcasting facility as distinguished from furrow planting. Alfalfa, clover, timothy and various classes of small grain seeds are thus most advantageously treated and for this purpose there is provided in accordance with the present invention a wheeled traction apparatus equipped with an open reservoir or pan in the bottom of which are discharge openings that may be regulated critically as to size so that the drain therethrough of seed during the course of travel of the implement is consistently steady in its volume. As the seed is discharged, it is permitted to fall into the path of rotating paddles, horizontally disposed, to impart continuous and successive hurling forces against the descending stream of seed towards the end that the distribution is achieved in an even, steady volume. Since various classes of seed differ from each other in size and weight, provision is made for adjusting the proportions of the openings so that by controlling the flow of the seed to the distribution paddles there may be regulated the intensity or concentration of planting.

This type of farm operation is usually accomplished on comparatively larger planting acreage and a principal seed supply is advantageously drawn behind a tractor vehicle in a large bin type of trailer. Behind this trailer the seed casting implement, which comprises the essential embodiment of the present invention, is drawn and through the power derived from its supporting wheels and axle, the seed casting mechanism is operated as the train is drawn to and fro in successive adjacent strips of an acreage to be planted. One operator is required to attend to the guidance and manipulation of the traction vehicle and its tandem of supply and broadcasting train, while a second attendant or operator is required to manually transfer replenishment from the intermediate bin vehicle, which carries the large volume of seed to the ultimate seed casting vehicle which accomplishes the broadcasting and even distribution of the seed. In this way the planting of the described classes of seed may be achieved for comparatively large areas expeditiously and economically.

It is a principal object of the invention to provide a seed broadcasting trailer implement which is powered from the force generated by its axle shaft and which may be predeterminately adjusted and intimately related to various classes of broadcast seed and fertilizer so as to be serviceable in land conditioning and in the planting of all types of small grain in commercial farming.

Another object of the present invention is to provide a power generating system which will perform its seed broadcasting functions at a variable rate of speed of operation in accordance with the speed of travel of its traction implement.

Still other objects of the present invention are such as will be disclosed more particularly during the course of the following detailed explanation and such as are set forth in the hereunto appended claims.

For a better understanding of the invention and the manner in which its objectives are obtained, reference will now be had to the accompanying drawings which will be described during the course of the following detailed specification and in which like reference characters designate corresponding parts throughout.

In the drawings:

Fig. 1 is a transverse sectional view through the center of a seed and fertilizer broadcasting implement and supporting vehicle embodying certain features of the present invention and is taken on a section line designated 1—1 of Fig. 2;

Fig. 2 is a plan sectional view of the apparatus disclosed in Fig. 1 and is taken approximately on line 2—2 of Fig. 1;

Fig. 3 is a plan elevational view, with fragmentary parts broken away of the seed broadcasting implement reservoir illustrating in dotted outline certain of its underlying operating mechanism;

Fig. 4 is an enlarged detail sectional view taken approximately on line 4—4 of Fig. 1;

Fig. 5 is a longitudinal sectional view through the same apparatus and is indicated by the line 5—5 of Fig. 1;

Fig. 6 is a plan view of a tractor vehicle, supply bin vehicle, and broadcasting implement coupled in tandem after the manner in accordance with a preferred method of practicing the present invention;

Fig. 7 is a detailed perspective view of a ratchet coupling clutch whereby power is transmitted through the trailer wheels to the main operating shaft and axle;

Fig. 10 is a fragmentary plan view of a further modified form of adapter whereby the same principal apparatus may be employed in the dissemination of extremely fine grain seed such as lawn grass and clover;

Fig. 11 is a fragmentary sectional view taken approximately on line 11—11 of Fig. 10;

Fig. 12 is a fragmentary sectional view taken approximately on line 12—12 of Fig. 10; and Fig. 13 is a fragmentary detailed view taken approximately on line 13—13 of Fig. 2 featuring an adjustment for the peripheral guides which direct and confine the broadcast stream intermediate the two paddle wheels.

Figure 8:
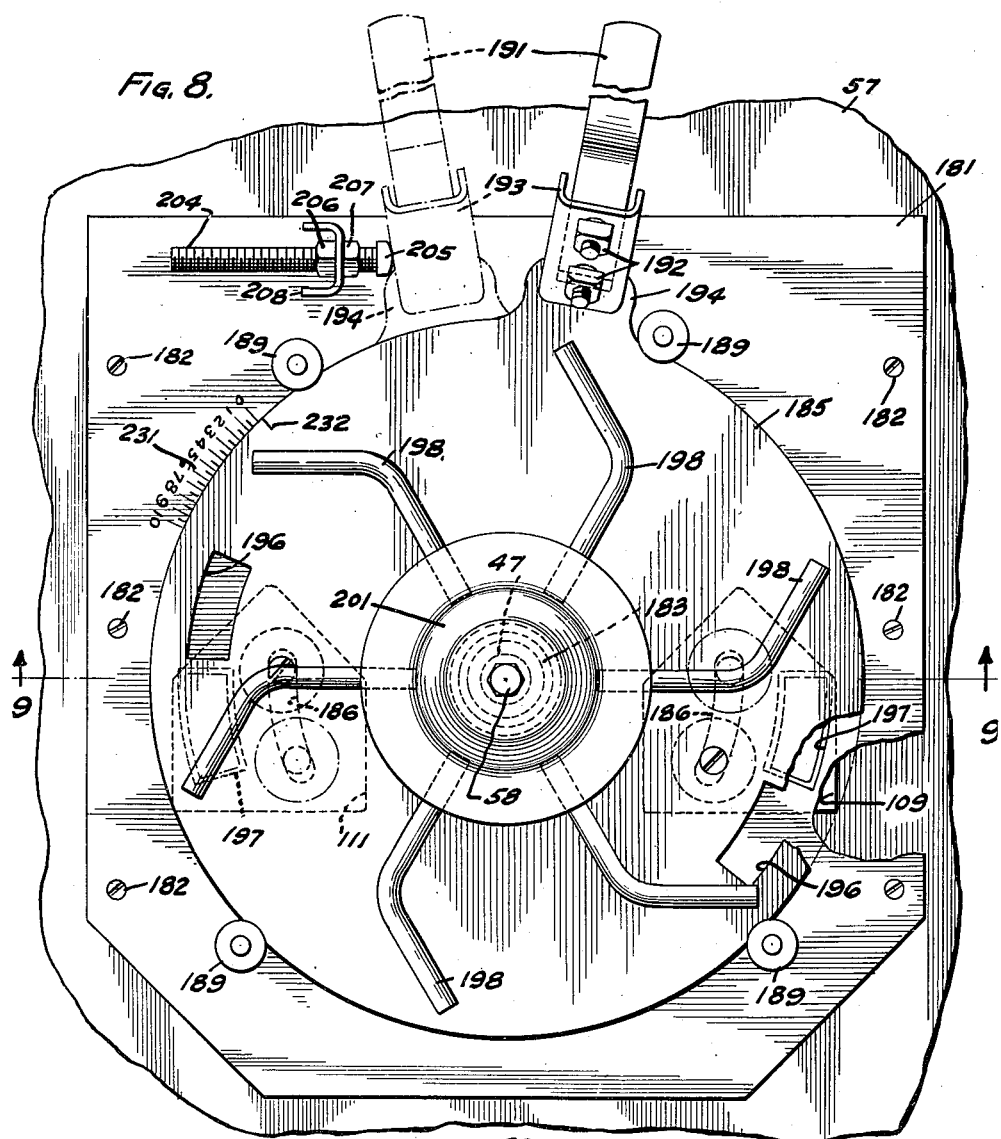
Fig. 8 is a fragmentary plan view of an auxiliary adapter device that may be superimposed upon or attached to the principal distributing apparatus featured in Figs. 1 through 6 for enabling the same primary apparatus to be employed in the distribution of a relatively finer type of broadcast seed such as, for example, oats or barley.
Figure 9:
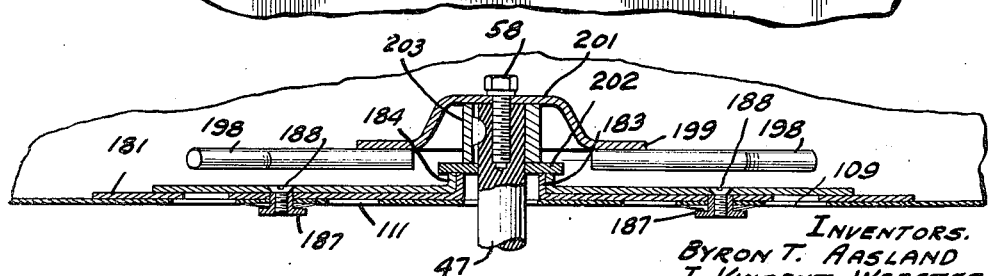
Fig. 9 is a detailed sectional view taken approximately on line 9—9 of Fig. 8 and features the attachment details whereby the apparatus of Fig. 8 is coupled to the principal mechanism.

Referring now more particularly to the accompanying drawings, attention is directed first to the reference numerals 21 and 22, of Fig. 6, which indicate a pair of trailer wheels that for all practical purposes may be of the conventional types of construction, including pneumatic tires mounted on annular rims 23 welded to flange disks 24. The latter are bolted as at 25 to the hub flanges 26 which may in turn be welded as at 27 to the axle hubs or sleeves 28.

The sleeves 28 are journaled on opposite ends of a transverse cylindrical axle 29, see also Fig. 7, and are thereat confined in any suitable manner, such as by the capping plates 31 and the securing bolts 32. One of the trailer wheels 22 is provided at its hub 28 with a cup flange 33 having secured in its radial plane a number, preferably three, of clutch pins 34 equally spaced in a circumferential sense about the longitudinal center of shaft 29 and adapted to be engaged by the teeth 35 of a multiple tooth clutching hub 36.

From Fig. 1 it may be observed that a keying or splining pin 37 which passes through the shaft 29 resides in the opposite longitudinal grooves 38 of a protrusion sleeve 39 integral with the driven member or clutch cup 36. A coiled thrust spring 39 under compression between the shoulder extremity 41 of the clutch cup and an integral sleeve 42 of the transmission case 43 maintains the former element resiliently in engagement with the coupling pins 34 so that during the forward motion of the vehicle power is transmitted by the wheel 22 and its hub sleeve 28 to the axle 29 as a result of the positive engagement between the pins 34 and the teeth 35 of the clutch cup 36. During the backward or reverse movement, however, the pins 34 will ascend the long cam surfaces 44, Fig. 7, of the clutch cup 36 and overcoming the influence of coil spring 39 will successively disengage or ratchet therewith.

The power which is transmitted to shaft 29 causes it to be rotated in a clockwise direction as viewed in Fig. 5, so that a beveled driving pinion 45 whose teeth mesh with those of a driven pinion 46 will cause to be imparted counter-clockwise rotation to a vertical shaft 47 as this shaft is viewed in Figs. 3, 8 and 10. The lower end of shaft 47 is appropriately journaled in a hub protrusion 48 of a nipple fitting 49 confined by a bracket 54 at the bottom of the gear case between the end thrust surfaces of the driving pinion hub 51 and a collar 52, which are set-screw secured to the shaft 29.

The vertical shaft 47, which is tributary to the driving axle 29, performs several driving functions and extends through an upper plate 53 which covers the transmission case, a frame channel 92 immediately thereover, a transverse strut channel 55 and eventually protrudes through the flat bottom plate 56 of a dished receptacle 57, the outline contour of which is best revealed in Fig. 3. At the upper end of shaft 47 there is bolted as at 58 an offset agitator vane 59. The arms of agitator vane 59 are disposed at different horizontal levels whereby to clear all parts of the receptacle 57. This member is provided to stir the mass of lime granules as it rotates in order to prevent coagulation or packing and to assure that the material is able to flow freely.

At a point shortly above the driven pinion 46, shaft 47 has keyed to it the hub of a driving sprocket 61 whose teeth mesh with the rollers of a link chain 62 that also encircles the driven sprocket 63 integral with a sleeve 64 secured to the distribution shaft 65. The companion distribution shaft 66 on the opposite side of the implement is driven in a direction reverse to that of shaft 65 by reason of the twin pulley wheels 67 and 68 adapted to receive a V-type pulley belt which is crossed as at 69 in order to produce opposite rotation in the two shafts 65 and 66. Shafts 65 and 66 are preferably disposed slightly to the rear of the principal vertical drive shaft 47 as best seen in Fig. 5, in order to permit the crossover 69 in the V-belt to clear the central shaft 47.

Shaft 47 is covered by a sleeve 71 and shafts 65 and 66 are similarly covered by sleeves 72 and 73 in order to prevent dust and chaff from unduly hampering the journal surfaces. The entire driving train and power distributing system which has just been described concerning the horizontal shaft 29, as well as the three vertical shafts 47, 65 and 66, is protected from undue exposure by a sheet metal encasing housing which has already been generally referred to as 43 and which comprises opposed dished flat end walls welded to a top plate 53 which is bolted as at 76 to a flange 77 which surrounds each of the distributor shafts 65 and 66. A foremost encasing panel 78, Fig. 5, which may be welded or otherwise secured as at 79 to the depending flange 81 integrally with the top plate 53 extends downwardly and curves around encircling the transmission mechanism up to and including the proximate midpoint where it is reinforced by a transverse edging strip 82. The rearmost part of the transmission housing is correspondingly covered, but in this case by a removable plate or covering 83 which engages the strip 82 with its offset 84, and terminates with a beaded edging 85. This member is held in place by a plurality of overcentering luggage type snap buckles 86, which engage latching pins 87.

In this way the removable panel 83 may, when the occasion requires it, be taken out of the way to afford access to the power transmission elements for greasing, repair or replacement. This sheet metal housing supports the receptacle 57 through a series of angle iron brace members 91 and 92 which are bolted, as at 93 and as at 76, to the top plate 53. Securement of the brace member 91 is had to the receptacle 57 as at 97 and member 91 is bolted to the upper draw bar brace 98 which is provided with a plurality of holes 99 where a bolt 101 clamps the brace to the drawbar 102. Through this adjustment as afforded by the different holes 99 the level, at which the draft clevis 103 is disposed for coupling to the next preceding vehicle in the tandem, may be varied to suit differences in manufacture practices of various bin trailer fabricators.

Thus far there has been described the power transmission system through which motion obtained from the axle of the trailer wheels is imparted to the three principal function performing shafts 47, 65 and 66, and there has been outlined generally the frame work construction of the transmission housing cover and strut bracing. The two shafts 65 and 66 are provided for the purpose of rotating the distributor fans 105 and 106, which they do in opposite directions as has already been explained. Each fan 105 and 106 is provided with six radially placed identical impeller blades 107 shaped of angle iron material with a slight angular overhang as has been designated 108 in Fig. 1. By means of the blades so arranged and shaped, there is produced the proper centrifugal effect in hurling the lime, gravel and seeds as they descend in to the path of the oncoming blades 107 from the openings 109 and 111 in the bowl or receptacle 57. As viewed in the plans of Figs. 2 and 3, fan 105 rotates clockwise and fan 106 rotates counter-clockwise. Since their related openings 109 and 111 are disposed over their adjacent surfaces, it will follow that the granular flow on the blades 107 will be thrown rearwardly of the unit as it is considered in Fig. 6 and will be distributed to a degree outwardly so as to produce a stream in a segment somewhat less than a semicircle.

In order to prevent the grain hurled from each fan from crossing over and colliding with the stream of its companion, there are provided a pair of curved baffles designated 112 and 113 made of angle metal to afford ample rigidity lengthwise and pivotally supported each on its own pivot stud 114 and 115, Fig. 2. The curvature of each baffle 112 and 113 is in corresponding concentricity with its related fan and for the purpose of establishing more accurately field adjustments to accord with varying conditions which affect the movement and velocity of the grain, adjustable forward supports as at 116 and 117 are provided in combination with appropriate slotted openings 118 and 119 into which these supports are fitted. As will be observed in Fig. 13 these supports are provided with wing nuts 121 so that by angling the baffles variously the pattern of the seed as it is spread may be critically adjusted.

In addition, notches 122 in the horizontal planes of the angle baffles permit the vertical planes to be bent thereat for the purpose of giving a further and different adjustment by compounding the baffle curvature into two radii of center. The baffles are supported on a sheet metal platform 123 having a flanged periphery and bolted as at 124 and 95 to the apron 125 and to the frame members 92, respectively. As will be observed from Fig. 5, the apron 125 is shaped to conform with the foremost curvature of the bowl and is secured to it by the already described system of bolts 95 as well as by the vertical wall bracket bolts 126.

Each fan 105 and 106 consists of a circular base plate invertedly dished and reinforced with a conical hub 127 which may be welded to the sleeve 128. The sleeve 128 as integrated with its related shaft 65 or 66 by means of feathering or bolting. The bent over portions 108 deflecting downwardly as they do maintain evenness in the horizontal thrust which is imparted to the seed and prevents the seed from acquiring upward trajectory but instead solely horizontal or downward components.

Two discharge openings 109 and 111 in the storage receptacle or bowl 57 have irregular pentagonal outline three of whose sides are rectangularly related to each other. The area of the openings 109 and 111 is great enough to pass the maximum quantity of line and gravel under the most dense to be desired of land covering conditions. When any regulation towards diminution is to be effected, an adjustable barrier 131 is interposed consisting of a twin bladed member having a portion 132 for closing the feed opening 109 and a portion 133 for closing the feed opening 111. In this way the volume of drainage through the feed openings 109 and 111 is maintained parallel so that the dispersal material may accordingly be distributed equally on both sides.

Member 131 is divided by the central notch 134, Fig. 3, in order to be able to straddle and pass well beyond shaft 47 and its surrounding sleeve. Its adjustment is regulated by rotating a crank 135, the forward shaft end of which is threaded as at 136, having screw engagement with a nut 137 which is secured, as by welding, to the central portion of member 131. By rotating the crank 135 until the twin barrier blades 132 and 133 assume the desired inter-position for producing the proper feeding stream through the openings 109 and 111, the apparatus may be made to discharge seeds or gravel in whatever concentration is desired or appropriate. Also this adjustment need not be changed for the purpose of total arrestment during transit from one row of planting to another since an auxiliary closure is provided for cutting off the remainder of the openings 109 and 111 for this purpose. The auxiliary device referred to comprises an opposed baffle member 141 having the twin blade portions 142 and 143, Figs. 3 and 4. Both members 131 and 141 may be guided in the same pair of track elements 144 and 145 secured to the bottom of the hopper receptacle 57 as best indicated in Fig. 1. However, whereas the metered adjustment blade 131 is susceptible of being nicely positioned by the screw threaded actuator or nut 137 and the threaded crank shaft 136, barrier 141 is rapidly movab'e under the actuation of a manual lever 148 pivoted at 149 in an anchor bracket 151. Lever 148 through its pivotable connection at 152 is capable of pulling and pushing a plunger rod 153 threaded as at 154 to a nut 155 welded to the cut-off barrier 141.

Regardless of the position of the metered barrier 131, that is to say, whether it be fully or slightly interposed to close the openings 109 and 111, quick operating barrier 141 may be interposed to close the remainder of the openings 109 and 111 when plunger rod 153 is projected leftwardly as viewed in Fig. 5 until the forward edges 156 of barrier 141 abut the forward edges 157 of barrier 131. When it is desired to do so, the metered barrier 131 may be advanced to seal off totally the openings 109 and 111 as indicated in Fig. 4.

As a result of stretchment or variation in manufacturing practices the driving belt which couples together shafts 65 and 66 may differ in length within contemplated limits though it is highly desirable that this belt shall be maintained adequately taut to insure synchronism through non-slippage in the rotation of the two shafts. Towards this end means have been provided for relatively adjusting the positions of these shafts in respect to the distance that one is from the other. As regards shaft 65 which carries the sprocket 63 and is chain driven from the shaft 47, a limiting factor is thereby encountered depending upon the amount of slack that may be taken up in the chain 62. Nevertheless, in a supporting bracket 161 which may be secured to the sleeve 72 which surrounds shaft 65, elongated openings 162 are provided whereby the bracket 161 may be adjustably bolted to the anchoring table 55 which is secured to sleeve 71. Similar openings are provided in the plate 53 where bolts 76 pass through the flanges 77 so that the entire shaft 65 may be relocated rightwardly as viewed in Fig. 1 for purposes of slack take-up.

The same arrangement is provided for the supporting bracket 163 which surrounds the sleeve 73 and which is correspondingly bolted to the support bracket or anchoring table 55. Likewise supporting flange 77 may be shifted in the elongated holes of the plate 53 where its bolts 76 pass through.

*Attachments*

The size of the openings 109 and 111 in the base plate portion of pan 57 contemplates a range of adjustments appropriate for the dissemination of lime, gravel or coarse field grains. Finer materials and those to be dispersed more thinly over the ground are better controlled by the use of supplementary attachments affording smaller discharge openings. Accordingly two attachment devices are provided illustrated in Figs. 8 to 12, whereby the degree of regulation may be made more critically suitable to smaller grains of seed and to more critical degrees of dissemination.

In Fig. 8 there is shown an attachment device comprising essentially a securing plate 181 applied to the floor of the receptacle 57 by means of a set of bolts 182. At its center plate 181 has formed an upturned flange 183 which affords a pivot journal to a smiliar flange 184 formed in a circular disk plate 185 adapted to be rotated throughout a limited arc of travel as indicated by the arcuate slots 186 in the plate 181. Ferrule nuts 187, cooperating with the countersunk screws 188 with which they have screw threaded engagement, pass through the slots 186 permitting sufficient marginal clearance to permit the aforedescribed limited range of adjustment. The periphery of the circular disk 185 is thereby held down to assure close fitting engagement with the plate 181 by a set of flanged spaced washers 189.

Rotation of the disk 185 is manually regulated by a detachable handle 191 bolted as at 192 to an angling bracket 193 secured to a lip 194 integral with the disk 185. Arcuate openings 196 in the disk 185 may be made to register in varying degrees of overlap with slightly larger openings 197 in the plate 181, both sets of openings in the same radial plane and registering opposite extremely outward portions of the openings 109 and 111 as best indicated in Fig. 8. The extent of adjustment afforded by the slots 186 permits the registration of openings 196 and 197 within the extremities indicated in dotted and solid outline in this figure.

A special form of seed agitator having a larger number of arms is provided for use in conjunction with finer classes of seed to prevent lumping and to augment even distribution comprising a plurality of bent rods 198 which are welded to the flange 199 of a securement hub 201 that may be held down by the bolt 58 just as the agitator 59 was so held down. A seal washer 202 prevents the seed from finding its way through to the center of the apparatus and a feathered sleeve 203 integrates the supplementary agitator with the shaft 47.

In order to establish any desired adjustment position at which openings 196 may register with openings 197, a limit screw 204 having a stop head 205 is provided and by means of the check nuts 206 and 207 screw 204 may be accurately located with respect to the anchor bracket 208 carried by plate 181. In this way a desired setting once determined may be reestablished by simply shifting the manually operating handle 191 from its full stop position as shown in solid outline in Fig. 8 to the predetermined adjustment position shown in dotted outline thereat. When the spreader vehicle is manoeuvred about in passing from one row to another and the flow of seed is to be totally arrested the present adaptation accordingly contemplates using the same apparatus as a total cut-off that is used in establishing the metered regulation.

In Figs. 10, 11 and 12, there is portrayed another attachment that may be placed and secured on the bottom of receptacle 57 by bolting as at 211 to the principal base plate 212 in a position so that the openings 213 will register over the large openings 111 and 109. Onto the base plate 212 there is placed a canister type of seed holder 214 having a flanged bottom 215 welded to a floor plate 216. The floor plate 216 is circular in outline except for its lip extension 217 which supports a bracket 218 for handle 219. The same hold-down bolts 189 discussed above may also be utilized in securing the floor plate 216 to the base plate 212 so as to permit the floor plate to be rotated throughout the arcuate range as determined by the length of the slots 221 through which there pass the limit screws 222. In the floor of plate 216 there are provided a pair of opposed feed slits 223 which are considerably smaller than the openings 196 of the first described attachment making this apparatus more particularly suitable in the dissemination of extremely fine seed such as grass and other. The degree of registration of openings 223 of the floor plate 216 with the openings 213 in the attachment plate 212 determines the egress and consequently the rate at which seed will be permitted to fall onto the dispersion paddles.

A corresponding adjustment screw 225 is here also provided so that through the manipulation handle 219 the device may be moved from total cut-off position to any special adjustment predeterminately attained. An agitator generally designated 226 resembles the agitator of Fig. 8 except that in this case the spider is made of a series of straight arms 227 which have been found by experimentation to serve best in the proper distribution of the finer seed. In both adaptations, Figs. 8 and 10, an engraved index 231 is provided near the circumference of the plates 185 and 216 so that for the purpose of making record of ideal settings the positioning of an engraving mark 232 with respect to the graduation 231 may be translated into a communicable or recordable reading.

While the present invention has been explained and described with reference to arbitrarily illustrated embodiments, it will be understood nevertheless that numerous modifications and variations may be made without departing from the essential spirit or scope thereof. It is accordingly not intended to be limited by the illustrations in the accompanying drawings nor by the particular language employed in the foregoing description except as indicated in the hereunto appended claims.

The invention claimed is:

1. In a vehicle for dispersing granular material for land conditioning and planting comprising, a framework affording journal support to a horizontally disposed axle shaft and to a plurality of vertically disposed power transmission shafts and carrying a supply hopper for granular material, a pair of trailer wheels journaled on said horizontally disposed axle shaft, clutch means for imparting rotation of said wheels to said axle shaft, a set of beveled gears coupling said axle shaft with one of said vertically disposed shafts, a chain and sprocket drive between said one of said vertically disposed shafts and a second vertically disposed shaft, belt drive pulleys carried by said second vertically disposed shaft and a third vertically disposed shaft, a cross-over belt for driving said third vertically disposed shaft in opposite rotation from said second vertically disposed shaft, an agitator for agitating said granular material in said supply hopper driven by said first vertically disposed shaft, and a pair of dispersal impellers driven in opposite rotation by said second and third vertically disposed shafts.

2. In a vehicle for dispersing granular material, a framework affording journal support to a horizontally disposed axle shaft and to a plurality of vertically disposed shafts, a receptacle for carrying a reserve of material, a pair of trailer wheels journaled on said axle shaft, apparatus for coupling said axle shaft with one of said vertically disposed shafts, a drive between said one of said vertically disposed shafts and a second vertically disposed shaft, pulleys carried by said second vertically disposed shaft and a third vertically disposed shaft, a crossed belt for driving said third vertically disposed shaft in opposite rotation from said second vertically disposed shaft, an agitator for granular material carried in said receptacle driven by said first vertically disposed shaft, and a pair of dispersal impellers for said material driven by said second and third vertically disposed shafts.

3. A trailer implement for dispersing granular material comprising, a wheeled supporting truck, a dished container on said truck, said dished container having a bottom wall in which are formed discharged openings through which the granular material carried in said container may be permitted to drain, means for regulating the volume of drain through said openings by cutting off corresponding areas thereof said means and openings being located adjacent the radial extremities of a plurality of paddle wheels, said plurality of paddle wheels rotatable in opposite directions to each other and disposed one beneath each of said openings for imparting horizontal trajectory to granular material discharged through said openings, and means to prevent the granular material horizontally trajected by said oppositely rotating paddle wheels from intersecting and colliding with each other comprising symmetrically opposite curved baffles formed of angle metal and presenting upstanding wall elements in concentricity with their respective paddle wheels, each baffle pivotally as well as slidably articulated to a securing surface on which it rests with its horizontal flange, and each with its horizontal flange notched to permit bending adjustment thereat by compounding its baffle wall curvature.

4. A trailer implement for dispersing granular material comprising, a wheeled supporting truck carrying a dished container having a bottom wall in which are formed adjacent discharge openings through which granular material carried in said container may be permitted to drain, slidable shutters for regulating the volume of drain through said openings, a pair of oppositely rotatable paddle wheels disposed beneath said openings for imparting horizontal trajectory to granular material discharged through its related opening, and means to prevent the granular material which drains through said adjacent openings of said respective paddle wheels from colliding which comprises, a pair of curved baffles located in symmetrical adjacency one with the other and each in concentricity with its respective paddle wheel, each baffle being pivotally and slidably articulated through its horizontal angle metal flange to a supporting surface and having its horizontal flange notched to afford further curvature adjustment whereby to closely regulate the dispersal spray angle of trajected granular material.

BYRON T. AASLAND.
J. VINCENT WEBSTER.

REFERENCES CITED

The following references are of record in the file of this patent:

UNITED STATES PATENTS

| Number | Name | Date |
|---|---|---|
| 148,663 | Buchanan | Mar. 17, 1874 |
| 241,924 | Buswell | May 24, 1881 |
| 323,683 | Hotham | Aug. 4, 1885 |
| 350,675 | Hathaway | Oct. 12, 1886 |
| 1,334,233 | Byrd | Mar. 16, 1920 |
| 1,508,210 | Bangert | Sept. 9, 1924 |
| 1,619,795 | Roby | Mar. 1, 1927 |
| 1,776,814 | Lutz | Sept. 30, 1930 |
| 2,060,652 | Arnold | Nov. 10, 1936 |
| 2,065,361 | Blake | Dec. 22, 1936 |
| 2,070,349 | Woodruff | Feb. 9, 1937 |
| 2,270,139 | Petway | Jan. 13, 1942 |
| 2,334,376 | Bauer | Nov. 16, 1943 |